(12) United States Patent
Hauf et al.

(10) Patent No.: US 8,085,435 B2
(45) Date of Patent: Dec. 27, 2011

(54) ADAPTIVE COLOR TRANSFORM TO CONTROL COLOR INCONSTANCY

(75) Inventors: Christopher R. Hauf, Pittsford, NY (US); Kevin E. Spaulding, Spencerport, NY (US); Douglas W. Couwenhoven, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 506 days.

(21) Appl. No.: 12/257,417

(22) Filed: Oct. 24, 2008

(65) Prior Publication Data

US 2010/0103438 A1 Apr. 29, 2010

(51) Int. Cl.
*G06F 15/00* (2006.01)
*G06K 9/00* (2006.01)

(52) U.S. Cl. .................................. 358/1.9; 382/162
(58) Field of Classification Search ........................ None
See application file for complete search history.

(56) References Cited

U.S. PATENT DOCUMENTS

| | | | | |
|---|---|---|---|---|
| 5,583,666 | A * | 12/1996 | Ellson et al. | 358/518 |
| 5,850,472 | A * | 12/1998 | Alston et al. | 382/162 |
| 6,118,895 | A * | 9/2000 | Hirota et al. | 382/165 |
| 6,637,861 | B2 | 10/2003 | Yamamoto | |
| 6,851,794 | B2 | 2/2005 | Yamamoto | |
| 7,365,879 | B2 | 4/2008 | Braun et al. | |
| 2002/0054306 | A1* | 5/2002 | Iida et al. | 358/1.9 |
| 2005/0111020 | A1 | 5/2005 | Yamamoto | |
| 2006/0250624 | A1 | 11/2006 | Spaulding et al. | |
| 2007/0291312 | A1* | 12/2007 | Kaneko et al. | 358/2.1 |
| 2010/0165137 | A1* | 7/2010 | Koishi | 348/222.1 |

* cited by examiner

*Primary Examiner* — Charlotte M Baker
*Assistant Examiner* — Barbara Reinier
(74) *Attorney, Agent, or Firm* — Kevin E. Spaulding (57) ABSTRACT

A method for selecting the level of color inconstancy of an output image produced on a digital color printer having a neutral ink and a plurality of color inks is disclosed. The method includes analyzing the distribution of input colors present in the input digital image to determine a color distribution metric related to the importance of producing output images having a reduced color inconstancy when the output image is viewed under a variety of image illumination spectra; selecting a color transform from a set of available color transforms designed to produce output images having different color inconstancy characteristics in response to the color distribution metric; processing the input digital image using the selected color transform to produce a transformed image having a selected level of color inconstancy; and printing the transformed image on the digital color printer to produce an output image having the selected level of color inconstancy.

9 Claims, 4 Drawing Sheets

ADAPTIVE COLOR TRANSFORM TO CONTROL COLOR INCONSTANCY

FIELD OF THE INVENTION

This invention pertains to the field of digital color printing, and more particularly to a method for reducing objectionable color inconstancy artifacts.

BACKGROUND OF THE INVENTION

Digital color printers typically form images by applying varying amounts of different colorants to a receiver media. One common class of digital color printers that is used for many different applications is inkjet printers. A typical inkjet printer reproduces an image by ejecting small drops of ink from a print-head containing ink nozzles, where the ink drops land on a receiver medium (typically paper) to form ink dots. Inkjet printers typically reproduce color images by using a set of color inks, usually cyan, magenta, yellow, and black. Different image colors can be formed by varying the number of ink drops for each of the different color inks that are printed in a local region of the image. The different spectral absorption characteristics of the inks enables the control of the spectral characteristics of the printed image, and therefore the color perceived by a human observer. For a given image spectra, the perception of color by a human observer can be characterized by the well-known CIE XYZ tristimulus values:

$$X = \int R(\lambda) I(\lambda) \bar{x}(\lambda) d\lambda$$

$$Y = \int R(\lambda) I(\lambda) \bar{y}(\lambda) d\lambda$$

$$Z = \int R(\lambda) I(\lambda) \bar{z}(\lambda) d\lambda \quad (1)$$

where $R(\lambda)$ is the reflectance spectrum of the printed image as a function of the wavelength, $\lambda$; $I(\lambda)$ is the spectrum of the light source illuminating the printed image; and $\bar{x}(\lambda)$, $\bar{y}(\lambda)$ and $\bar{z}(\lambda)$ are the CIE color matching functions, which are related to the spectral sensitivities associated with human vision. Often, the CIE XYZ values are transformed into other color spaces such as the well-known CIELAB color space, which are more visually uniform. The CIELAB color space has three color channels: L*, which is a measure of the lightness of the color; a*, which is a measure of the redness-greenness of the color; and b*, which is a measure of the yellowness-blueness of the color. The chroma of a color is a measure of its colorfulness. For the CIELAB color space, the chroma is defined by the relationship:

$$C^* = \sqrt{a^{*2} + b^{*2}}. \quad (2)$$

Visual color differences are often estimated by computing the Euclidean distance between two CIELAB color values. This quantity is referred to as $\Delta E^*$:

$$\Delta E^* = \sqrt{(L^*_2 - L^*_1)^2 + (a^*_2 - a^*_1)^2 + (b^*_2 - b^*_1)^2} \quad (3)$$

Color transforms are typically used with digital color printers to determine the amounts of each of the colorants that are necessary to accurately reproduce a desired input color. For example, if it is desired to make an inkjet print of an image that is displayed on a softcopy display, the input color (e.g., the CIELAB values) for a given image pixel can be determined by characterizing the color response of the display. The color transform will then determine the amounts of the colorants (e.g., cyan (C), magenta (M), yellow (Y) and black (K) inks) that should be used to produce the desired CIELAB values. For digital color printing systems having more than 3 colorants there are typically a plurality of different colorant combinations that can all produce the same CIELAB values. For example, consider the case where it is desired to produce a gray color with L*=50, a*=0, b*=0 on an inkjet printer having CMYK inks. It would be possible to produce the desired color using only the cyan, magenta and yellow inks and no black ink. On the other hand, it would be possible to produce the same color using only black ink, with no cyan, magenta and yellow inks. Alternatively, some intermediate level of the black ink could be used, together with some intermediate amount of cyan, magenta and yellow inks. The choice of which combination of ink amounts should be used is determined by the designer of the color transforms, taking into account a number of different factors such as the amount of ink that the media can absorb and the image granularity characteristics as a function of the ink amounts. For example, using more K and less CMY will generally use lower ink amounts and will therefore be less susceptible to artifacts such as coalescence. However, the graininess of images using larger amounts of K is usually higher due to the fact that the black ink drops are more visible to a human observer. The designer of the color transforms must balance these types of characteristics to determine the CMYK colorant amounts that will produce the highest overall image quality.

Another attribute that can impact the image quality of images produced on digital color printers is color inconstancy. Color inconstancy results when the color appearance of an image changes when it is viewed under different light sources. The cause for the artifact can be understood by considering Eq. (1). The XYZ values, and therefore the perceived color of the image, are a function of the product of the spectrum of the light source, $I(\lambda)$, and the image reflectance spectrum, $R(\lambda)$, together with the color matching functions. Depending on the shapes of these spectra, significantly different perceived colors may result when the light source is changed. For example, a patch in the image may appear to be neutral gray when observed under daylight illumination, but may appear to have a reddish tint when observed under tungsten illumination and a greenish tint when observed under fluorescent illumination. In some cases, the magnitude of the color shift may be quite noticeable, and depending on the image content may be quite objectionable. Generally, the color shifts are most objectionable in near-neutral and skin tone colors.

The magnitude of the color shifts associated with color inconstancy will be a strong function of the colorants used to produce a particular color. Generally, colorant combinations which produce image spectra having more distinct spectral peaks will be most susceptible to color inconstancy artifacts, particularly when viewed under light sources having sharp spectral transitions (e.g., fluorescent illuminants). A "process neutral" color produced by combining cyan, magenta and yellow inks will typically have a spectra with three distinct peaks associated with the absorption bands of the three inks. As a result, it will generally be much more sensitive to color constancy artifacts than a neutral color produced using black ink alone which would generally have a much flatter reflection spectra. Similarly, using a mixture of CMY and K inks will produce an intermediate level of color inconstancy.

The fact that colors produced using larger amounts of black ink will have substantially lower levels of color inconstancy artifacts would suggest that it would be desirable to use high levels of black ink in the design of color transforms for CMYK digital color printers. However, as mentioned earlier, there are a number of other factors that need to be considered. One of the most significant factors is the image granularity. The image granularity associated with the use of higher levels of black ink can significantly degrade the image quality due to the fact that the black ink dots are generally darker and more visible than cyan, magenta and yellow ink dots. Therefore, in the design of a color transform, it is necessary to balance color inconstancy artifacts with granularity artifacts and select the transform that would be preferred for the particular image.

U.S. Pat. No. 6,637,861 describes a method for building color transforms that determines the level of black ink usage by setting a limit on the acceptable color shifts induced by color inconstancy effects. A typical color shift limit is given to be $\Delta E^* = 4$ across a defined set of illuminants. U.S. Patent application 2005/0111020 describes a variation of this method where black ink is only used in the color transform for darker colors. This has the effect of limiting the image granularity in highlight regions of an image where the black ink dots will be most visible.

U.S. Pat. No. 7,365,879 and U.S. Patent Application 2006/0250624 describe methods for building color transforms using a multi-dimensional cost function to determine an optimal balance between different attributes that affect image quality. A color inconstancy index is given as one attribute that can be included in the multi-dimensional cost function, together with other attributes such as an ink volume metric, an image noise metric, a lightfastness metric, a waterfastness metric, a gloss metric or a metameric index.

The optimal balance between color transforms that limit color inconstancy artifacts and those that limit other artifacts such as image granularity is generally quite image dependent. Grayscale images, as well as color images having a lot of near-neutral colors are particularly sensitive to objectionable color inconstancy effects. Therefore, for these types of images the optimal balance will typically limit color inconstancy artifacts by using higher levels of black ink while accepting somewhat higher levels of other artifacts such as image granularity. On the other hand, observers will generally be much more tolerant of color inconstancy artifacts for color images that are dominated by high chroma colors and have very little near-neutral image content. In these cases, the optimal balance will typically use lower levels of black ink in order to minimize artifacts such as image granularity.

It is well-known in the art that it may be desirable to use different color transforms for different types of image content. For example, different color print modes are often provided for color and grayscale images. The different print modes are generally selected by the user in the printer driver at the time that a document is printed. For example, U.S. Pat. No. 6,851,794 describes a method where a plurality of color transforms having different color inconstancy limits are determined, providing different compromises between color inconstancy artifacts and other types of artifacts. The user can select the transform that is most desirable for a particular image/application by making a selection in the printer driver. However, this method has the disadvantage that it requires the user to navigate through menus in the printer driver in order to access these benefits and has to understand what choice is best for different images. This can result in a very unsatisfying user experience.

SUMMARY OF THE INVENTION

It is an object of the present invention to provide a way to select the level of color inconstancy of an output image produced on a digital color printer having a neutral ink and a plurality of color inks as a function of the distribution of input colors in an input digital image.

These objects are achieved by a method for selecting the level of color inconstancy of an output image produced on a digital color printer having a neutral ink and a plurality of color inks for an input digital image having a distribution of input colors, comprising:

a) analyzing the distribution of input colors present in the input digital image to determine a color distribution metric related to the importance of producing output images having a reduced color inconstancy when the output image is viewed under a variety of image illumination spectra;

b) selecting a color transform from a set of available color transforms designed to produce output images having different color inconstancy characteristics in response to the color distribution metric;

c) processing the input digital image using the selected color transform to produce a transformed image having a selected level of color inconstancy; and d) printing the transformed image on the digital color printer to produce an output image having the selected level of color inconstancy

Advantages

This invention has the advantage that color inconstancy artifacts can be reduced for input images where these artifacts are most objectionable, while reducing other artifacts for images that are less sensitive to color inconstancy artifacts.

This invention has the additional advantage that the compromise between reducing color inconstancy artifacts and other types of artifacts is done automatically, without any need for user selection or intervention. This provides for a much simpler user interface and a more satisfying user experience.

A further advantage of this invention is that it can eliminate the need for the user interface of a digital color printer to provide an explicit grayscale print mode that must be selected by the user.

DETAILED DESCRIPTION OF THE INVENTION

Figure 1:
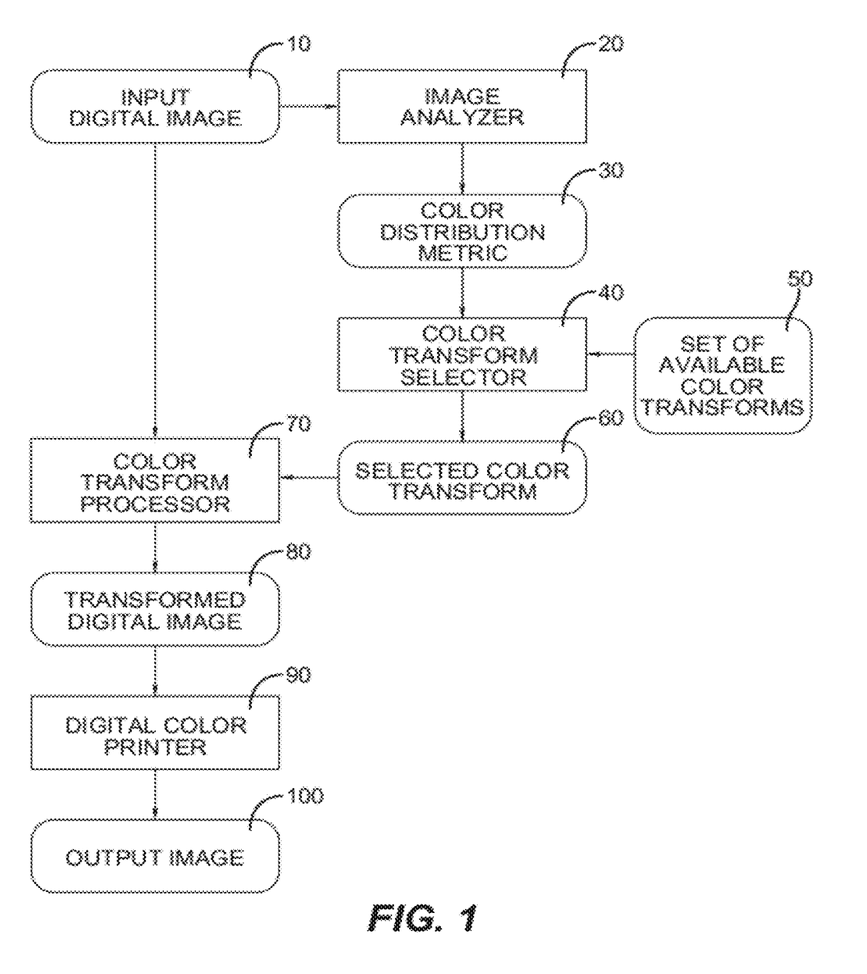
FIG. 1 is a flow diagram illustrating the method of the present invention.

The present invention will now be described with reference to FIG. 1, which illustrates a flow chart for printing an input digital image 10 on a digital color printer to produce an output image 100 having a selected level of color inconstancy. An image analyzer 20 is used to analyze the distribution of input colors present in the input digital image 10 to determine a color distribution metric 30. The color distribution metric 30 is an indication of the importance of producing an output image having reduced color inconstancy when the output image 100 is viewed under a variety of image illumination spectra. A color transform selector 40 is then used to choose a selected color transform 60 from a set of available color transforms 50 that are designed to produce output images having different color inconstancy characteristics, responsive to the color distribution metric 30. Next, a color transform processor 70 is used to apply the selected color transform 60 to the input digital image 10 to produce a transformed digital image 80, which is subsequently printed on the digital color printer 90 to produce the output image 100 having a selected level of color inconstancy. As will become apparent hereinafter, the method of the present invention automatically determines a preferred color transform providing a compromise between reducing color inconstancy artifacts and other types of artifacts, without any need for user selection or intervention.

In a preferred embodiment of the present invention the digital color printer 90 is an inkjet printer having four inks (cyan, magenta, yellow and black). While the examples discussed in the remainder of this patent will be given with reference to a four-color inkjet printer, it will be understood by one skilled in the art that the invention can be applied to other types of printers, and other ink sets, as well. For example, it could be used for printers having light and dark cyan and magenta inks, gray inks or so-called "hi-fi" ink colors such as green and orange. Generally, the set of inks used by the digital color printer will include a neutral ink (i.e., black or gray) and a plurality of color inks so that the level of color inconstancy artifacts can be controlled by trading off between the levels of the neutral ink and the color inks that are used to produce a particular output color.

Each of the steps in the method of the present invention will now be discussed in more detail. The input digital image 10 may take a number of different forms. In one preferred embodiment, the input digital image 10 is a digital photograph, such as a digital image captured by a digital camera. However, the input digital image 10 may also be other types of images such as documents containing a mixture of text, computer generated graphics and photographs. The input digital image 10 may be represented using many different input color spaces depending on the application and workflow. In a preferred embodiment of the present invention, the input image will be in the well-known sRGB color space, although this is not a requirement. For example, other color spaces such as the well-known ROMM RGB, Adobe RGB, Adobe PhotoShop LAB or SWOP CMYK color spaces could be used.

The image analyzer 20 can take a number of different forms. In one preferred embodiment of the present invention, the image analyzer 20 determines a color distribution metric 30 that relates to the amount of near-neutral image content in the input digital image 10. An input digital image 10 having a large amount of near-neutral image content would produce a large value of the color distribution metric 30, whereas an input digital image 10 having little or no near-neutral image content would produce a small value of the color distribution metric 30.

Figure 2:
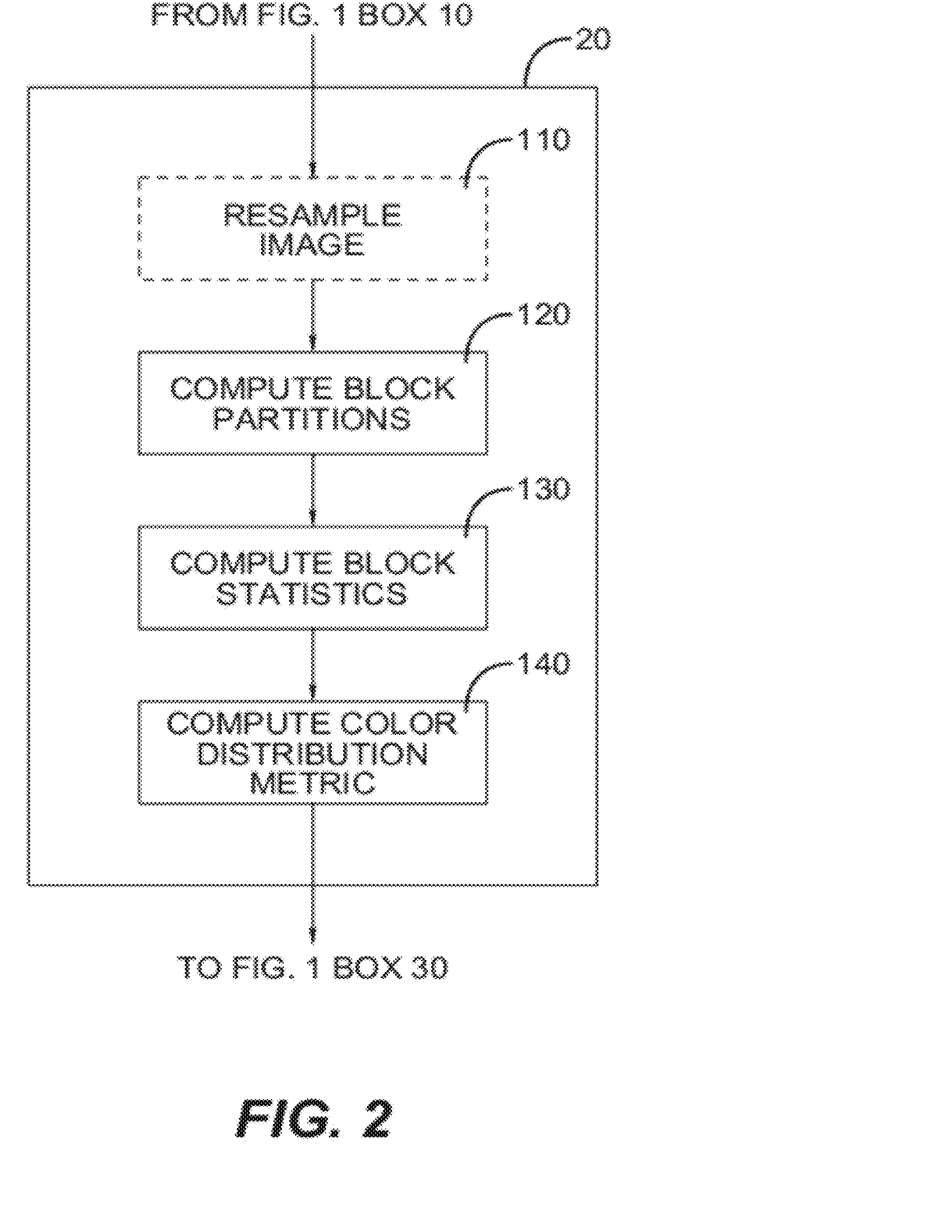
FIG. 2 is a flow diagram for one embodiment of an image analyzer operation.

Turning now to FIG. 2, the details of the image analyzer 20 are shown according to one preferred embodiment of the present invention. Typically, the input digital image 10 may contain a very large number of image pixels, often numbering in the millions. The color distribution metric 30 can generally be determined using a much lower resolution image without any degradation of the accuracy. Therefore, an optional resample image step 110 can be used to produce a lower resolution input image. This has the benefit that the computations applied for the remaining steps of the image analyzer can be carried out more quickly and using smaller amounts of computer memory. It will generally be desirable for the image resample step 110 to determine the lower resolution input image by averaging groups of input pixels rather than simply sub-sampling the input pixels since this will better preserve the average color as a function of position. Equivalently, the lower resolution input image can be determined by low-pass filtering the input digital image 10 followed by a sub-sampling operation. However, for applications where computation speed is of primary importance, acceptable performance may be obtained in many cases by using a simple sub-sampling operation.

Figure 3:
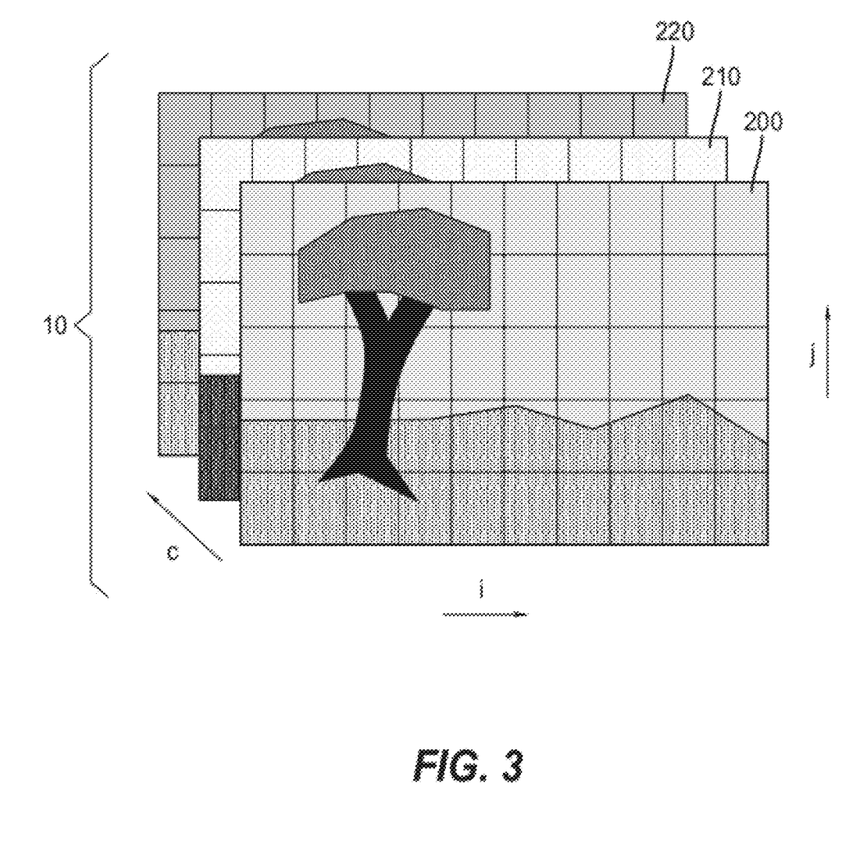
FIG. 3 is a diagram illustrating partitioning an image into blocks.

Next, a compute block partitions operation 120 is used to partition the input digital image into a set of non-overlapping blocks. FIG. 3 shows an input digital image 10 having 3 color planes 200, 210 and 220, which correspond to red, green and blue color planes, respectively. Each color plane is partitioned into a set of spatially non-overlapping blocks using the compute block partitions operation 120 of FIG. 2. The index "i" indicates the block column, the index "j" indicates the block row, and the index "c" indicates the color channel. The number of blocks created in the partition and the dimensions of the image blocks can be of any size, but in a preferred embodiment the block size is chosen to correspond to the smallest size of an image region that is likely to be sensitive to color inconstancy artifacts.

Turning back to FIG. 2, a compute block statistics operation 130 is used to compute a block statistics signal for each block formed by the compute block partitions operation 120. In a preferred embodiment of the present invention, the block statistics will include the average code values for each color channel of the pixels contained within the block, but the block statistics could also include other statistical quantities as well, such as the standard deviation, minimum code value, maximum code value, and others.

After the block statistics signal is computed for each block, a compute color distribution metric operation 140 is used to compute the color distribution metric 30. The color distribution metric 30 is related to the importance of producing output images having a reduced color inconstancy when the output image is viewed under a variety of output illuminant spectra. In a preferred embodiment of the present invention, the color distribution metric 30 relates to the amount of near-neutral image content in the input digital image 10. For images having a large amount of near-neutral image content, the color distribution metric 30 would indicate that it is more important to produce output images having a reduced color inconstancy. In a variation of this approach, the color distribution metric 30 can also be related to the amount of skintone-colored image content, or to other color regions that are determined to be sensitive to color inconstancy artifacts. Since color inconstancy artifacts will generally be less objectionable for highly-saturated images, the color distribution metric 30 will generally be inversely related to the amount of highly-saturated image content. For images having a large amount of highly-saturated image content, the color distribution metric 30 would indicate that it is less important to produce output images having a reduced color inconstancy.

There are many ways that a color distribution metric 30 could be determined. For example, one simple embodiment would be to count the number of image blocks where the average chroma value was below a certain threshold in order to estimate the fraction of the image that is comprised of near-neutral colors. For images having a large number of near-neutral blocks, it would be more important to produce output images having a reduced color inconstancy when the output image is viewed under a variety of output illuminant spectra.

Another embodiment would be to calculate the chroma value associated with the average code values for each block, and then to determine the average chroma value across all of the blocks. However, this method has the disadvantage that it would be unable to distinguish between an image that was half gray and half high chroma, and another image that had no gray, but was all of moderate chroma.

A variation on this method would be to compute a weighting factor that is a function of the input color value and then determine the average weighting factor value. In a preferred embodiment of the present invention, the weighting factor relates to the importance of producing a reduced color inconstancy as a function of the average code values for a particular block. The weighting factor would typically be high for near-neutral colors and lower for highly chromatic colors. For example, a weighting factor value of 255 could be associated with perfectly neutral colors, and a weighting factor value of 0 could be associated with high chroma colors. One functional form for the weighting factor that could be used is:

$$W = \frac{255}{1 + kC^*} \quad (4)$$

where C* is the CIELAB chroma value, and k is a constant. The a* and b* values can be calculated from the input code values using an appropriate model of the input color space. This weighting factor has the characteristic that it is large for small chroma values and falls off inversely with the chroma, therefore giving high weight to neutral image blocks while de-weighting highly colorful image blocks. More sophisticated weighting factor could also be used that would assign high weighting factor values to other regions of color space where color inconstancy artifacts may be particularly objectionable, such as skintone colors.

A simpler variation of the weighting factor given in Eq. (4) would involve using a chroma metric that would be simpler to calculate. For example the $YC_RC_B$ color space is a commonly used "luma-chroma" color space based on video RGB color spaces where the Y, $C_R$, and $C_B$ color values can be determined by a simple matrix transformation from the RGB code values.

$$\begin{bmatrix} Y \\ C_R \\ C_B \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad (5)$$

A "chroma" value that could be used in place of the C* value in Eq. (4) could then be calculated as $C=(C_R^2+C_B^2)^{1/2}$.

In a preferred embodiment of the present invention, the weighting factor values are pre-calculated and stored in a three-dimensional look-up table addressed by the input code values rather than calculating them on the fly. As will be known to one skilled in the art, it is often prohibitive (in terms of computer memory or disk space) to store a fully sampled three-dimensional look-up table that contains entries for every combination of R, G and B code values on the range 0-255. Therefore, a common technique is to store the weighting factor values on a subset of RGB code values. For example, Table 1 shows a portion of a three-dimensional look-up table where the ROB code values are sampled on 32 code value intervals. It can be seen that for RGB values which are neutral (e.g., R=G=B=0), the weighting factor has a value of 255, and that the magnitude of the weighting factor falls off for more colorful colors. The weighting factor for a given block can be determined by interpolating between the weighting factor values stored in the three-dimensional look-up table, or alternatively can be determined by quantizing the average code values for the block to the nearest node in the look-up table.

TABLE 1

| R | G | B | Weighting Factor |
|---|---|---|---|
| 0 | 0 | 0 | 255 |
| 0 | 0 | 32 | 97 |
| 0 | 0 | 64 | 60 |
| 0 | 0 | 96 | 43 |
| 0 | 0 | 123 | 34 |
| 0 | 0 | 160 | 28 |
| 0 | 0 | 192 | 24 |
| 0 | 0 | 224 | 21 |
| 0 | 0 | 255 | 18 |
| 0 | 32 | 0 | 94 |
| 0 | 32 | 32 | 95 |
| 0 | 32 | 64 | 66 |
| 0 | 32 | 128 | 48 |
| ... | ... | ... | ... |
| 255 | 255 | 160 | 44 |
| 255 | 255 | 192 | 61 |
| 255 | 255 | 224 | 99 |
| 255 | 255 | 255 | 255 |

In the examples that were given above, the color distribution metric 30 is a continuous variable that may take on many different values throughout some defined range. In this case, one form for the color transform selector 40 involves defining a series of thresholds defining ranges of the color distribution metric 30 corresponding to each color transform in the set of available color transforms 50. For example, consider the case where there are two color transforms in the set of available color transforms 50 (a first color transform using less black ink and therefore producing larger color inconstancy artifacts, and a second color transform using more black ink and therefore producing smaller color inconstancy artifacts). In this case, two ranges of color distribution metric 30 can be defined using a single color distribution metric threshold value. If the color distribution metric 30 is less than the color distribution metric threshold value, then the first color transform would be identified as the selected color transform 60. If the color distribution metric 30 is larger than the color distribution metric threshold value, then the second color transform would be identified as the selected color transform 60. In some cases it may be desirable to define more than two color transforms having different levels of color inconstancy artifacts. In this case, multiple thresholds could be defined breaking the range of color distribution metric values into three or more intervals corresponding to each of the color transforms in the set of available color transforms 50.

Figure 4:
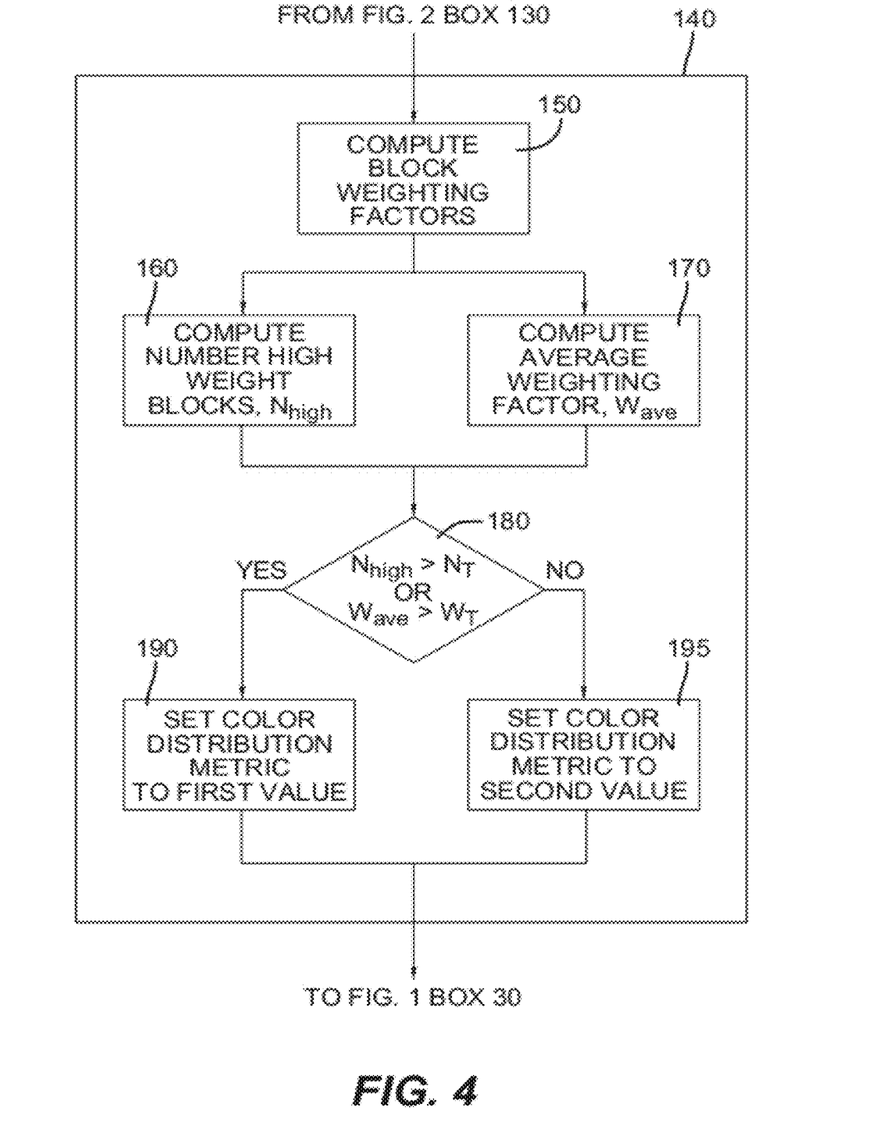
FIG. 4 is a flow diagram illustrating one embodiment of a compute color distribution metric operation.

If an image has a large number of near-neutral image blocks, it will generally be desirable to select a color transform producing smaller color inconstancy artifacts. On the other hand, even if there are a relatively small number of near-neutral image blocks, it may still be desirable to select a color transform producing smaller color inconstancy artifacts if most of the image content is relatively low in chroma. A flowchart showing a version of the compute color distribution metric operation 140 that can be used to simultaneously address both of these cases is shown in FIG. 4. First a compute block weighting factors operation 150 is used to compute a weighting factor for each block using a function or a three-dimensional look-up table as described earlier. Next, a compute number of high weight blocks step 160 is used to determine the number of high weight blocks $N_{high}$ where the weighting factor exceeds a defined threshold value, and a compute average weighting factor step 170 is used to determine the average weighting factor across the blocks, $W_{ave}$. In some cases, it may be desirable to only consider blocks in a central region of the image since that is where the most important image content is typically located.

Next a decision operator 180 is used to set the color distribution metric 30 to a value indicating which color transform from the set of available color transforms 50 should be used for that image. In a preferred embodiment of the present invention, the decision operator 180 will invoke a set color distribution metric to first value step 190 if the number of high weight blocks $N_{high}$ exceeds a threshold number of blocks $N_t$, or the average weighting factor across the blocks $W_{ave}$ exceeds a threshold weighting factor $W_t$. Otherwise, a set color distribution metric to second value step 195 is invoked. The set color distribution metric to first value step 190 will set the color distribution metric to a first value (e.g., "0") that will signal the color transform selector 40 to select a color transform producing smaller color inconstancy artifacts. The set color distribution metric to second value step 195 will set the color distribution metric to a second value (e.g., "1") that will signal the color transform selector 40 to select a color transform producing larger color inconstancy artifacts. In some cases, it may be desirable to design the decision operator 180 with more complex logic. For example, it might be used to select three different color distribution metric values, rather than the two shown in this example.

The color transforms in the set of possible color transforms 50 are designed to produce output images having different color inconstancy characteristics. Generally, the different color inconstancy characteristics are obtained by varying the amount of black ink that is used to produce a given color. For example, a mid-gray color can be made with equal amounts of cyan, magenta and yellow inks and no black ink. In contrast, it could be made using black ink with no cyan, magenta and yellow inks. Or it could be made by some combination of cyan, magenta, yellow and black inks. The control of how much black ink is used in a color transform is often referred to using terms such as "black strategy" or "under color removal" (UCR) or "gray component replacement" (GCR). Generally, color transforms that use more neutral ink(s) (i.e., black or gray) will produce lower levels of color inconstancy artifacts, together with a correspondingly higher level of certain other image artifacts such as granularity. Similarly, color transforms that use less neutral ink(s) and more color inks will produce higher levels of color inconstancy artifacts while producing lower levels of granularity. Therefore, in a preferred embodiment of the present invention, the different color transforms in the set of possible color transforms will correspond to different levels of neutral ink usage.

In addition to choosing different color transforms as a function of the color distribution metric 30, it may sometimes be desirable to alter other parts of the printer's imaging chain as well. For example, it may be desirable to use different "print modes" for an inkjet printer as a function of the color distribution metric 30. The print mode for an inkjet printer would include such attributes as the number of printing passes, the speed that the print head is traversed across the page, the number of ink drops that are applied and which printing pass that they are applied on. Consider the case where the image analyzer determines that an input image is a purely grayscale image having only neutral image content. For such images, it may be desirable to select a grayscale print mode that is optimized for printing grayscale images.

The invention has been described in detail with particular reference to certain preferred embodiments thereof, but it will be understood that variations and modifications can be effected within the spirit and scope of the invention.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

Parts List 10 input digital image
20 image analyzer
30 color distribution metric
40 color transform selector
50 set of available color transforms
60 color transform
70 color transform processor
80 transformed digital image
90 digital color printer
100 output image
110 optional resample image step
120 compute block partitions operation
130 compute block statistics operation
140 compute color distribution metric operation
150 compute block weighting factors operation
160 compute number of high weight blocks step
170 compute average weighting factor step
180 decision operator
190 set color distribution metric to first value step
195 set color distribution metric to second value step
200 red color plane
210 green color plane
220 blue color plane

The invention claimed is:

1. A method for selecting the level of color inconstancy of an output image produced on a digital color printer having a neutral ink and a plurality of color inks for an input digital image having a distribution of input colors, comprising:
   a) analyzing the distribution of input color present in the input digital image to determine a color distribution metric providing an indication of the importance of producing a corresponding output image having a reduced color inconstancy when the output image is viewed under a variety of image illumination spectra;
   b) selecting a color transform from a set of available color transforms designed to produce output images having different color inconstancy characteristics in response to the color distribution metric;
   c) processing the input digital image using the selected color transform to produce a transformed image having a selected level of color inconstancy;
   d) printing the transformed image on the digital color printer to produce an output image having the selected level of color inconstancy.

2. The method of claim 1, where the color distribution metric relates to the amount of near-neutral image content in the input digital image.

3. The method of claim 1, where the color distribution metric relates to the amount of skintone-colored image content in the input digital image.

4. The method of claim 1, where the color distribution metric relates to the amount of highly-saturated image content in the input digital image.

5. The method of claim 1, where the set of available color transforms use varying amounts of neutral ink to control the color inconstancy characteristics of the output image.

6. The method of claim 1, where the set of available color transforms represents having different color inconstancy characteristics and granularity characteristics for output images produced using the color transforms.

7. The method of claim 1, where color transforms producing reduced color inconstancy are selected for input digital images where the color distribution metric indicates that it is important to produce output images having a reduced color inconstancy.

8. The method of claim 1, further including modifying the print mode of an inkjet printer responsive to the color distribution metric.

9. The method of claim 8, where a grayscale print mode is selected for images where the color distribution metric indicates that the input digital image has only neutral image content.

* * * * *